US008200101B2

(12) United States Patent
Ue et al.

(10) Patent No.: US 8,200,101 B2
(45) Date of Patent: Jun. 12, 2012

(54) CONDITION DETERMINING SYSTEM, METHOD OF DETECTING ABNORMALITY OF CONDITION DETERMINING SYSTEM, AND IMAGE FORMING APPARATUS

(75) Inventors: Kohji Ue, Ebina (JP); Yasushi Nakazato, Tokyo (JP); Osamu Satoh, Sagamihara (JP); Masahide Yamashita, Tokyo (JP); Jun Yamane, Yokohama (JP)

(73) Assignee: Ricoh Company, Limited, Tokyo (JP)

( * ) Notice: Subject to any disclaimer, the term of this patent is extended or adjusted under 35 U.S.C. 154(b) by 446 days.

(21) Appl. No.: 12/486,881

(22) Filed: Jun. 18, 2009

(65) Prior Publication Data

US 2009/0324259 A1 Dec. 31, 2009

(30) Foreign Application Priority Data

Jun. 27, 2008 (JP) ................................ 2008-168101

(51) Int. Cl.
*G03G 15/00* (2006.01)
*G06F 11/30* (2006.01)

(52) U.S. Cl. ........................................... 399/9; 702/182

(58) Field of Classification Search ...... 399/9; 702/182, 702/183, 185; 358/1.14
See application file for complete search history.

(56) References Cited

U.S. PATENT DOCUMENTS

| | | | |
|---|---|---|---|
| 5,606,408 | A | 2/1997 | Yano et al. |
| 5,638,159 | A | 6/1997 | Kai et al. |
| 5,740,494 | A | 4/1998 | Shoji et al. |
| 5,765,087 | A | 6/1998 | Yano et al. |
| 6,799,012 | B2 | 9/2004 | Shakuto et al. |
| 6,819,892 | B2 | 11/2004 | Nakazato et al. |
| 6,937,830 | B2 | 8/2005 | Satoh |
| 6,987,944 | B2 | 1/2006 | Shakuto et al. |
| 7,027,751 | B2 | 4/2006 | Miura et al. |
| 7,103,301 | B2 | 9/2006 | Watanabe et al. |
| 7,110,917 | B2 | 9/2006 | Matsuura et al. |
| 7,184,674 | B2 | 2/2007 | Satoh et al. |
| 7,218,879 | B2 | 5/2007 | Enoki et al. |
| 7,444,097 | B2 | 10/2008 | Suzuki et al. |
| 2003/0020760 | A1 | 1/2003 | Takatsu et al. |
| 2005/0058474 | A1 | 3/2005 | Watanabe et al. |
| 2005/0281596 | A1 * | 12/2005 | Nakagawa et al. ........... 399/350 |
| 2007/0258723 | A1 | 11/2007 | Nakazato et al. |
| 2008/0068639 | A1 | 3/2008 | Satoh et al. |
| 2009/0034990 | A1 | 2/2009 | Nakazato et al. |

FOREIGN PATENT DOCUMENTS

| | | | |
|---|---|---|---|
| JP | 7-28363 | | 1/1995 |
| JP | 07111504 A | * | 4/1995 |
| JP | 3442174 | | 6/2003 |
| JP | 2005-17874 | | 1/2005 |

* cited by examiner

*Primary Examiner* — David Gray
*Assistant Examiner* — Billy J Lactaoen
(74) *Attorney, Agent, or Firm* — Oblon, Spivak, McClelland, Maier & Neustadt, L.L.P.

(57) ABSTRACT

A system abnormality determining method comprises the steps of transmitting fake abnormal information representing an abnormal condition of the target instrument from the target instrument to a condition determination device via a network during a test operation of the target instrument instead of condition information, determining if the condition determination device can determine the target instrument as being abnormal based on the fake abnormal information, and operating the target instrument in a normal operation condition when the condition determination device can determine the target instrument as being abnormal.

7 Claims, 6 Drawing Sheets

CONDITION DETERMINING SYSTEM, METHOD OF DETECTING ABNORMALITY OF CONDITION DETERMINING SYSTEM, AND IMAGE FORMING APPARATUS

CROSS REFERENCE TO RELATED APPLICATION

This application claims priority under 35 USC §119 to Japanese Patent Application No. 2008-168101, filed on Jun. 27, 2008, the entire contents of which are herein incorporated by reference.

BACKGROUND OF THE INVENTION

1. Field of the Invention

The present invention relates to a condition determining system capable of determining a condition of a target instrument, such as an image forming apparatus, using a condition determining apparatus by connecting the condition determining apparatus with the target instrument to execute communications therebetween via a communication network, a method of detecting abnormality of such a system, and an image forming apparatus.

2. Discussion of the Background Art

It is described in the Japanese Patent Application Laid Open No. 8-195849 that in a control apparatus connected to a communication network with a target instrument, condition information transmitted from the target instrument is analyzed so as to expedite maintenance for the target instrument. Specifically, a condition determining system is disclosed in which plural image forming apparatuses calculate times of sheet jam occurrence, and when a provability of frequency of jam occurrence increases, jam alarm information (i.e., condition information) indicating such a condition is transmitted to the control apparatus. In such a system, the control apparatus accumulates the alarm information transmitted from each of the image forming apparatuses, determines tendency thereof, and recognizes an abnormal condition in which a service person needs to visit when the tendency matches with a prescribed pattern. Then, the control apparatus transmits such abnormality information to a terminal installed in a service basis in charge of the image forming apparatus.

However, in a conventional condition determining system, it is unknown if condition information from the instrument is correctly handled from when the instrument is installed and is set up at a user site to ordinarily operate to when the instrument practically transmits the condition information to the control apparatus so that the control apparatus recognizes the abnormality. Further, in a conventional condition determining system, a test as to if a transmission of condition information from a target instrument is in deed possible before installation thereof. However, the test can only confirm feasibility of the transmission, and cannot confirm as to if the control apparatus appropriately practically deals with abnormal information when transmitted.

SUMMARY OF THE INVENTION

The present invention has been made in view of the above noted and another problems and one object of the present invention is to provide a new and noble system abnormality determining method. Such a new and noble system abnormality determining method comprises the steps of transmitting fake abnormal information representing an abnormal condition of the target instrument from a target instrument to a condition determination device via a network during a test operation of the target instrument instead of condition information, determining if the condition determination device can determine the target instrument as being abnormal based on the fake abnormal information, and operating the target instrument in a normal operation condition when the condition determination device can determine the target instrument as being abnormal.

In another embodiment, a condition information transmitting device is provided in the target instrument to transmit condition information representing a condition of the target instrument to the condition determination device in the normal operation mode at a prescribe time beside the fake abnormal information.

In yet another embodiment, the target instrument includes a control mode switching device that switches a control mode to one of a test operation mode for executing a prescribed test and a normal operation mode and a condition information transmission device that transmits condition information representing a condition of the image forming apparatus to the condition determination device during the normal operation at a prescribe time.

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF PREFERRED EMBODIMENTS

Figure 1:
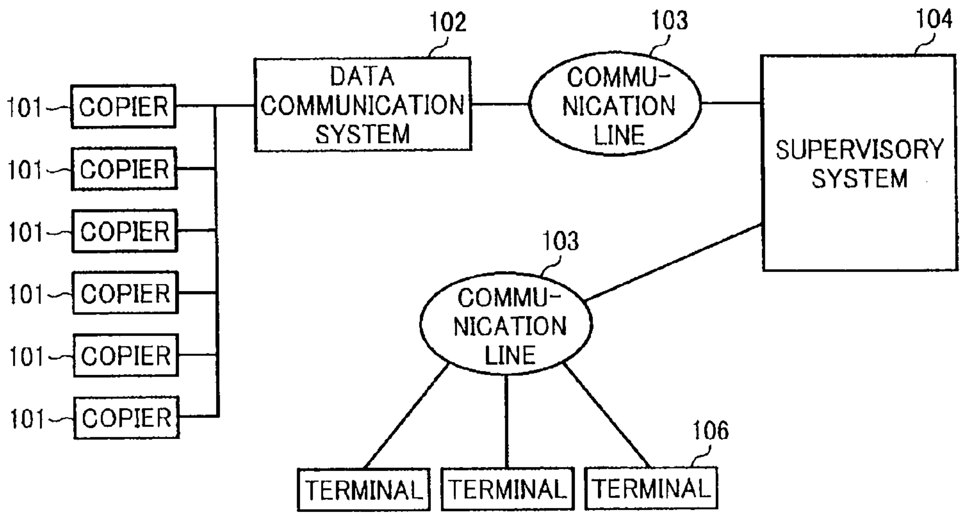
FIG. 1 schematically illustrates an exemplary malfunction prediction system according to one embodiment of the present invention.

Referring now to the drawings, wherein like reference numerals and marks designate identical or corresponding parts throughout several figures, in particular in FIG. 1, one example of a condition determining system serving as a malfunction predicting system operated by a provider of the copier including a copier of an electro-photographic system, a control apparatus, and a terminal, is described. According to this embodiment, the malfunction predicting system analyses condition information periodically transmitted from plural copiers at a condition information analyzing section serving as a determination device of a control apparatus. The malfunction predicting system then transmits maintenance information to a terminal apparatus located at a service basis when malfunction is predicted. The terminal apparatus can include a mobile instrument carried by a service person or a console type installed at the service basis. Instead of the malfunction predicting system predicting a malfunction of a copier, a malfunction diagnosis system or the other system can be employed in this embodiment.

Now, the entire configuration of the malfunction predicting system according to this embodiment is initially described with reference to FIG. 1. As shown, plural copiers 101 are arranged at a user site such as an office, etc., and are connected to a control apparatus 104 installed at a control center 104 via a communication network formed by a data communications apparatus 102 and a communication line 103 or the like. The control apparatus 104 is also connected to a terminal 106 installed at each of the service basis via a communication line 105. Such communication lines 103 and 105 may include a line network, such as a LAN, a WAN, a telephone line, etc., and Internet can be used.

Figure 2:
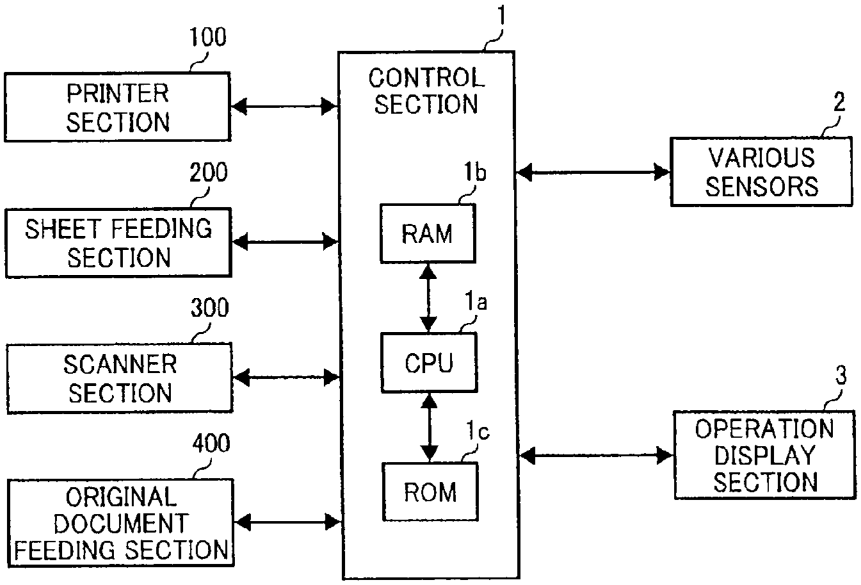
FIG. 2 schematically illustrates an exemplary pertinent section of a copier constituting the malfunction prediction system of FIG. 1.

Now, an exemplary configuration and operation of the copier are described with reference to FIG. 2. The copier includes an information acquiring device that acquires various information related to conditions of element factors thereof and phenomena occurring inside. The information acquiring device includes a control section 1, various sensors 2, and an operation display section 3. The control section 1 generally controls the copier and includes a CPU 1*a* serving as a calculation device, a RAM 1*b* that stores calculation data and control parameter or the like, a ROM 1*c* serving as an artificial information storage device that stores control program and artificial abnormal information. The operation display section 3 includes a display such as a liquid crystal display, etc., for displaying character information or the like, and an operation reception section, such as a ten-pad key, etc., for receiving and transmit input information to the control section 1.

Figure 3:
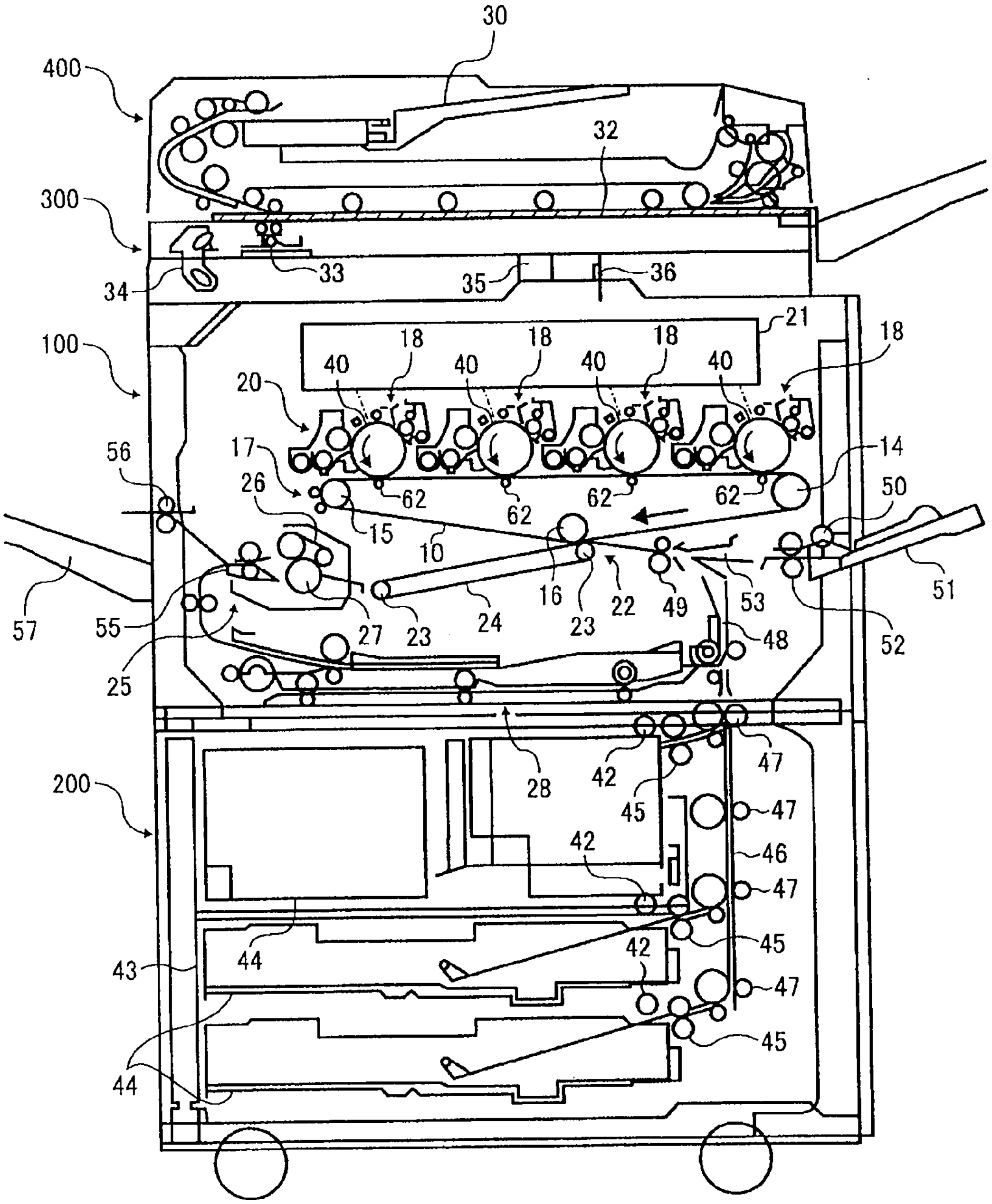
FIG. 3 schematically illustrates an exemplary outline configuration of the entire copier of FIG. 2.

An image forming apparatus employing an electro-photographic system according to this embodiment is described with reference to FIG. 3. An image forming device of the copier serves as an image formation system 6 and includes a printer section 100, a sheet feeding section 200, a scanner section 300, and an original document conveying section 400. The scanner section 300 is attached above the printer section 100. The original document conveyance section 400 including an ADF (automatic original document feeder) is attached above the scanner section 300. The control section 1 is also provided.

The scanner section 300 reads image information of an original document set onto a platen glass 32 using a reading sensor 36 and transmits the image information to the control section 1. The control section 1 controls a laser or a LED and the like arranged in an exposure device 21 included in the printer section 100 to emit a writing laser light L to each of photoconductive member drums 40Bk, 40Y, 40M, and 40C in accordance with the image information received from the scanner section 300. Thus, latent images are formed on the photoconductive member drums 40Bk to 40C and are developed into toner images when subjected to developing processes, respectively.

The printer section 100 includes a primary transfer device 62, a secondary transfer device 22, a fixing device 25, a sheet ejection device, and a toner supplying device, not shown, beside the exposure device 21.

The sheet feeding section 200 includes plural sheet feeding cassettes 44 in multi steps in a paper bank 43, a sheet launching roller 42 that launches a transfer sheet as a recording medium from the sheet-feeding cassette 104, a separation roller 45 that separates and feeds the launched transfer sheets P onto a sheet feeding path 46, and a conveyance roller 47 that conveys the transfer sheet P onto a sheet-feeding path 48 included in the printer section 100. Beside the sheet feeding section, a manual sheet-feeding tray 51 is provided at one side to enable manual sheet feeding in this embodiment of the apparatus. Specifically, a separation roller 52 is arranged to separate the transfer sheets P on the manual sheet-feeding tray 51 one by one toward a manual sheet-feeding path 53. A pair of registration rollers 49 ejects only one transfer sheet P stacked either on the manual sheet feeding tray 51 or on the sheet feeding cassette 44 and conveys the same to a secondary transfer nip created between an intermediate transfer belt 10 as an intermediate transfer member and the secondary transfer device 22.

In the above-mentioned configuration, when a color image copy is made, an original document is set on an original document setting table 30. Other wise, the original document conveyance section 400 is open and the original document is set on the platen glass 32 of the scanner section 300 and is closed to depress the original document. When the original document is set on the original document conveyance section 400 and a start switch, not shown, is depressed, the original document is conveyed onto the platen glass 32. When the original document is set onto the platen glass 32, the scanner section 300 is immediately driven, so that first and second carriages start running. Then, the first carriage 33 emits a light from a light source thereof, and the light reflected by the original document surface is reflected toward the second carriage 34. The light is then reflected by a mirror of the second carriage 34 and enters a reading sensor 36 via an imaging lens 35, thereby image information is read. Upon receiving the image information from the scanner section, the above-mentioned laser writing and the later mentioned developing process are performed, so that toner images are formed on the respective photoconductive member drums 40Bk, 40Y, 40M, and 40C. At same time, to feed a transfer sheet P having a size matching with the image information, one of registration rollers is driven. Simultaneously, a driving motor, not shown, drives and rotates one of supporting rollers 14, 15, and 16, and causes the remaining supporting rollers to be driven rotated, so that the intermediate transfer belt 10 is rotated and conveyed. At same time, respective photo conductive member drums 40Bk to 40C are rotated in the image formation units 18, so that mono color images of black to cyan are formed on the respective photoconductive member drums. Then, as the intermediate transfer belt 10 travels, the mono color images are transferred onto the intermediate transfer belt 10 one after another so that a superimposed color image is formed thereon.

Further, by selectively rotating one of sheet feeding rollers 42 of the sheet feeding tray 200, transfer sheets P are launched from one of the sheet feeding cassettes 44 and separated one by one by the separation roller 45, thereby entering the sheet feeding path 46. Then, the sheet P is fed by the conveyance roller 47 onto the sheet-feeding path 48 arranged in the printing section 100 and collides the registration roller 49 thereby stopping there. Otherwise, the sheet-feeding roller 50 is rotated so that the transfer sheets P on the manual sheet-feeding tray 51 are fed and separated by the separation roller 52 one by one, thereby entering the manual sheet-feeding path 53. The transfer sheet P then collides and stops at the registration roller 49. Then, in synchronism with the superimposed color image on the intermediate transfer belt 10, the registration roller 49 is rotated, so that the transfer sheet P is conveyed to a contact section between the intermediate transfer belt and the secondary transfer roller 23. The color image is then subjected to the secondary transfer and is printed on the transfer sheet P under influence of a transfer use electric field and contact pressure created at the nip.

The transfer sheet P having been subjected to the image transfer is then launched into the fixing device 25 by a conveyance belt 24 of the secondary transfer device. The toner image of the transfer sheet P is fixed by a pressure-applying roller 27 in the fixing device 25 under pressure and heat so that the toner image is fixed. Then, the transfer sheet P is ejected onto a sheet ejection tray 57 by the sheet ejection roller 56.

Figure 4:
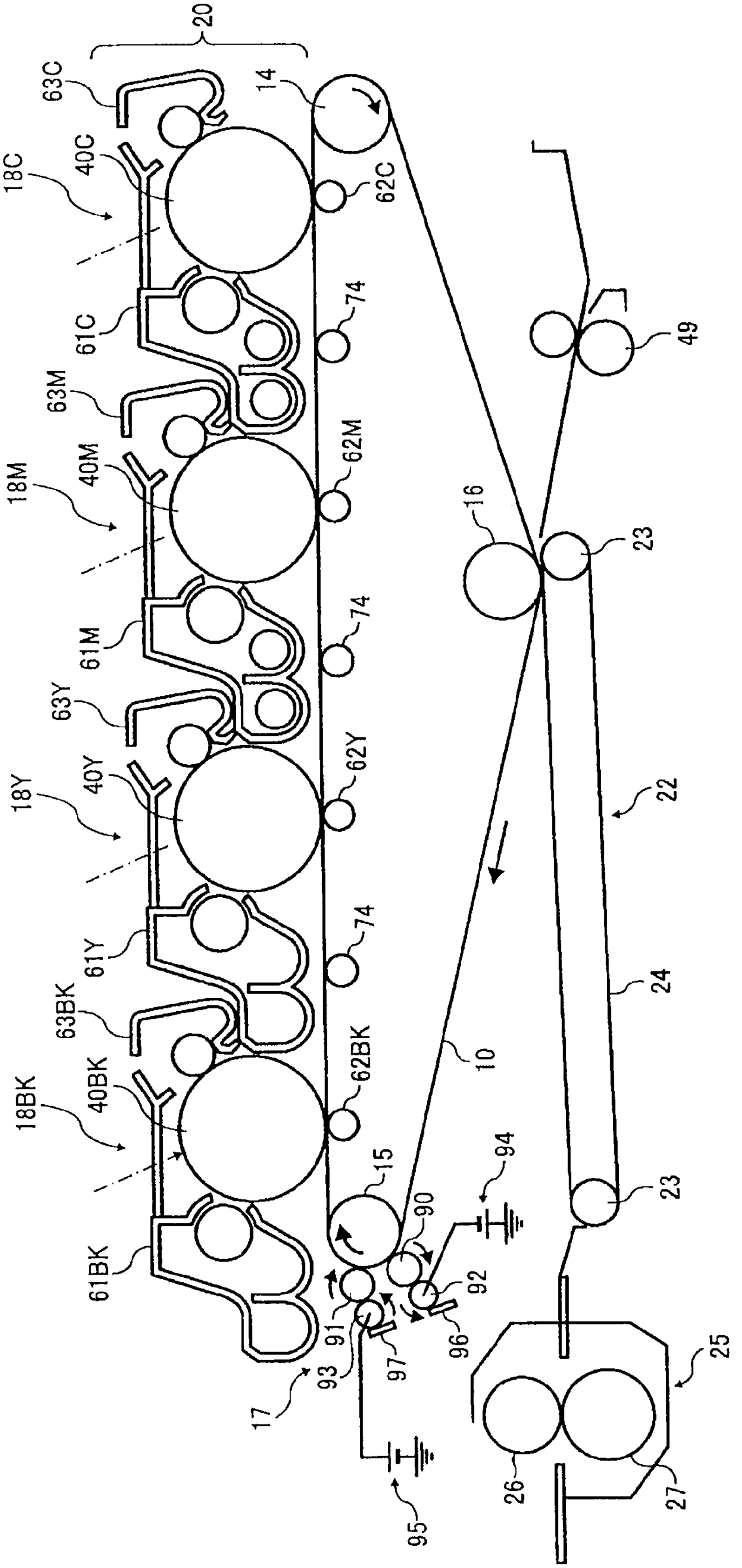
FIG. 4 is an enlarged view illustrating a pertinent section of a printing section included in the copier of FIG. 3.

Now, a printer section 100 of the copier accordance with this embodiment is described more in detail with reference to FIG. 4. As shown, the printer section 100 includes an intermediate transfer belt 10 supported by a three supporting rollers 14, 15, and 16. In the printer section 100, four photoconductive member drums 40Bk to 40C oppose the intermediate transfer belt and arranged side by side for carrying color toner images of black, yellow, magenta, and cyan, respectively, and plural developing units 61Bk to 61C for developing forming toner images on the surfaces of the photoconductive member drums are provided. Further, plural photoconductive member cleaners 63Bk to 63C are included to remove toner remaining on the surfaces of the photoconductive member drums after primary transfer. Thereby, a tandem image forming apparatus 20 is formed by the plural photoconductive member drums 40Bk to 40C, the plural developing units 61Bk to 61C, the plural photoconductive member cleaning devices 63Bk to 63C, and the four image formation units 18Bk to 18C. On the left side of the supporting roller 15, a belt cleaning device 17 is arranged to remove toner remaining on the intermediate transfer belt 10 after transfer of the toner image onto the transfer sheet.

In the cleaning device 17, a pair of fur brushes 90 and 91 is arranged as a cleaning member. The fur brushes 90 and 91 are made of acrylic carbon each having a diameter of about 20 mm, 6.25 D/F, a hundred thousand pieces/inch$^2$, and $1\times10^7$ ohm, and collectively contact the intermediate transfer belt 10 while rotating in a reverse direction to the intermediate transfer belt 10. Then, a bias of different polarity is applied to each of the fur brushes 90 and 91 by a power source, not shown. Plural metal rollers 92 and 93 contact the fur brushes 90 and 91 while rotating in the same or different direction to the fur brushes 90 and 91.

Specifically, the power source 94 applies a negative voltage to the metal roller 92 arranged upstream of the intermediate transfer belt 10, while the power source 95 applies a positive voltage to the metal roller 93 arranged downstream thereof. Tips of the blades 96 and 97 contact the metal rollers 92 and 93. Then, as the intermediate transfer belt 10 rotates in a direction shown by an arrow, the fur brush 90 arranged upstream initially applies a negative bias voltage and cleans the surface of the intermediate transfer belt 10. If −700V is applied to the metal roller 92, the voltage of the fur brush 90 becomes −400V, and positive toner on the intermediate transfer belt 10 can be transferred to the side of the fur brush 90. The toner transferred to the side of the fur brush 90 is further transferred to the metal roller 92 by a difference of the voltage, and is scraped off therefrom by a blade 96. Although the fur brush 90 removes the toner from the intermediate transfer belt 10, a lot of toner still remains on the intermediate transfer belt 10. However, the toner is charged in a negative voltage by the negative bias applied to the fur brush 90. Because, the toner is provably charged by electricity injection or discharge. Then, the fur brush 91 arranged downstream applies the positive bias to executed cleaning, and as a result, the toner can be removed. The removed toner is transferred onto the metal roller 93 from the fur brush 91 by a difference of the voltage and is scraped off therefrom. The toner scraped off by the blades 96 and 97 is then collected into a tank, not shown. These toner particles can be returned to a developing device 61 using a toner recycling system mentioned later.

A small amount of toner still remains on the surface of the intermediate transfer belt 10 even after the fur brush 91 clears almost all of the toner particles. However, such toner is charged in the positive voltage by the positive bias applied to the fur brush 91 as mentioned above. The toner charged in the positive voltage is transferred onto the side of the photoconductive member drums 40Bk to 40C by a transfer electric field created at a primary transfer position, and is collected by the photoconductive member cleaning device 63.

A secondary transfer device 22 is provided on the opposite side of the intermediate transfer belt 10 to the tandem image forming apparatus 20. In the secondary transfer device 22, a secondary transfer belt 24 is wound around a pair of rollers 23. A secondary transfer nip section is formed by pressure contacting a third support roller 16 via the intermediate transfer belt 10. Thus, a color toner image on the intermediate transfer belt 10 is transferred onto a transfer sheet as secondary transfer. The toner remaining on the intermediate transfer belt 10 after the secondary transfer is removed by the belt cleaning device 17 and the intermediate transfer belt 10 is prepared for image formation in the tandem image forming apparatus 20 again. In the above-mentioned secondary transfer device 22, a transfer sheet P conveyance function to convey a transfer sheet P to a fixing device 25 after the image transfer is provided. Of course, as the secondary transfer device 22, a transfer roller or a non-contact charger can be arranged. In such a situation, the transfer sheet conveyance function is hardly exerted.

The registration roller 49 is generally frequently used being grounded. However, to remove paper dust of the transfer sheet P, a bias can be applied. For example, a conductive rubber roller is employed to apply the bias. The conductive rubber roller has a diameter of about 18 mm. A surface layer of the roller is made of conductive NBR rubber having a thickness of about 1 mm. As an electric resistance of rubber member, a cubic resistance of about $10\times10^9$ ohm·cm is used. About −800 volt is applied to a toner transfer side (i.e., a front side), and about +200 volt, to the sheet rear side, respectively.

Although the DC bias is applied as the bias voltage, an AC voltage having a DC offset component can be employed to more uniformly charge the transfer sheet P. Thus, the surface of the sheet is slightly charged in negative when passing through the registration roller 49 to which the bias is applied. Accordingly, a transfer condition changes when transfer from the intermediate transfer belt 10 to the transfer sheet P is executed in comparison with a case when the voltage is not applied to the registration roller 49.

Further, a transfer sheet reversing device 28 (see FIG. 3) is provided below the secondary transfer device 22 and the fixing device 25 in parallel to the tandem image forming apparatus 20 to reverse the transfer sheet P so as to record images on both sides thereof. Thus, a course of the transfer sheet P is switched by a switching pick to the side of the transfer sheet reverse device after fixing an image onto one side of the sheet P. By reversing in this way, a toner image is transferred at the secondary transfer nip again and the sheet P can be ejected onto the sheet ejection tray.

Figure 5:
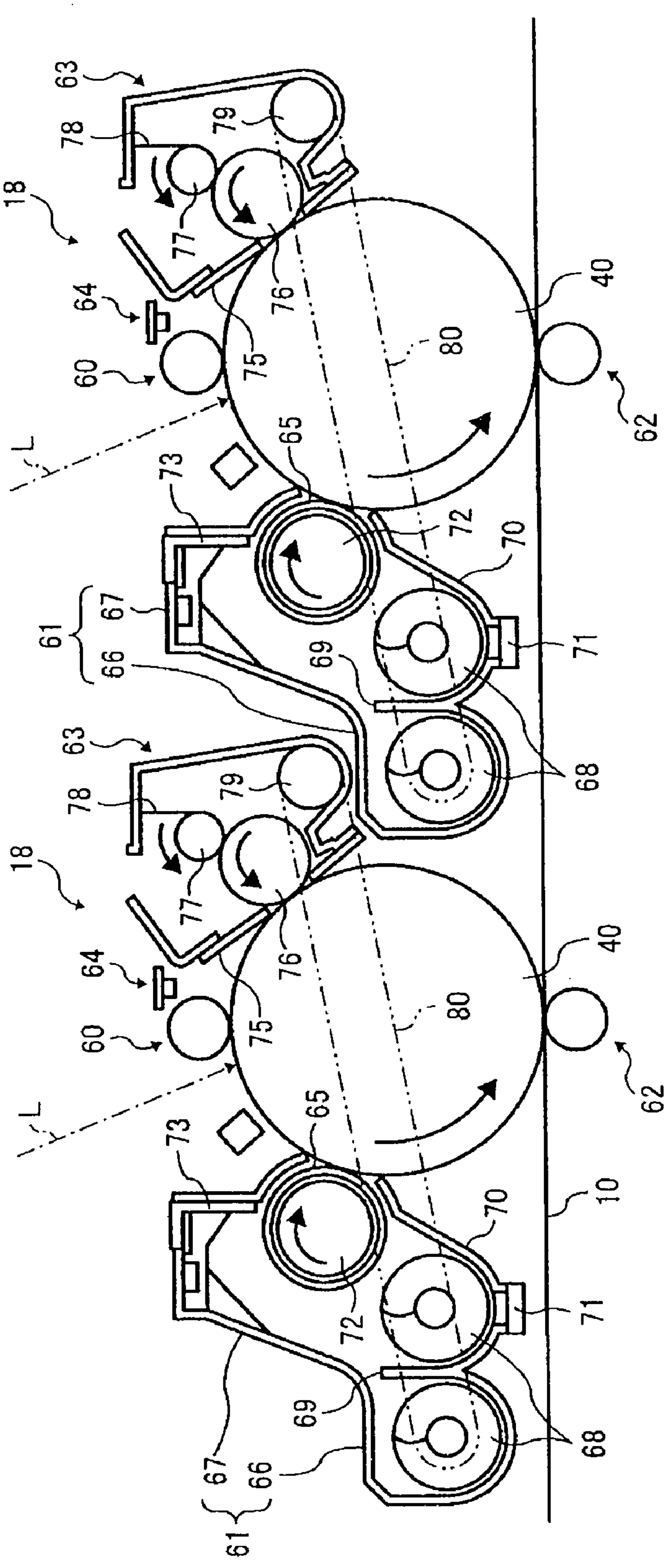
FIG. 5 is a partially enlarged view of a tandem image forming apparatus included in the printing section of FIG. 4.

Now, the tandem image forming apparatus 20 is described more in detail with ref to FIG. 5. The four image formation units 18Gk to 18C have substantially the same configuration. Thus, only one unit is typically described omitting color symbols Bk to C. As shown in FIG. 14, in the image formation units, around each of the photoconductive member drums 40Bk to 40C, a charge device 60, a developing device 61, a primary transfer device 62, a photoconductive member cleaning device 63, and a charge removing device 64 or the like are arranged. Each of the photoconductive member drums 40Bk to 40C is a drum type that includes a bear tube made of aluminum or the like coated with organic photoconductive material thereby forming a photoconductive layer. However, they can be an endless type.

Although not shown in the drawings, by at least including the photoconductive member drum (40Bk to 40C), the image formation unit 18 is entirely or partially formed into a process cartridge detachable in a block to and from a printer section 100 in order to improve a maintenance performance. Further, among the sections constituting the image formation unit 18, the charge device 60 is formed in a roller state as shown in the drawing and contacts and applies a bias voltage to the photoconductive member drums 40Bk to 40C, so that the photoconductive member drum (40Bk to 40C) can be charged. Of course, a non-contact type scorotron charger can execute charging.

The developing device 61 can use one component developer, but typically uses two component developer including magnetic carrier and non-magnetic toner as shown. A stirring section 66 is provided to convey and supply as well as attract the two-component toner to the developing sleeve 65 while stirring thereof. Further, a developing section 67 is arranged above the stirring section 66 to transfer toner included in the two-component developer attracting to the developing sleeve 65 to the photoconductive member drum (40Bk to 40C). A pair of screws 68 is arranged in parallel to each other in the stirring section 66 being separated by a partition plate 69 at the portion other than both ends of the screws 68. A toner density sensor 71 is provided in a developing casing 70. In the developing section 67, the developing sleeve 65 is arranged opposing the photoconductive member drum (40Bk to 40C) through an opening formed on the developing casing 70 while securing a magnet 72 inside. A doctor blade 73 is arranged with its tip being in the vicinity of the developing sleeve 65. As shown, a gap of about 500 micrometer is formed as the minimum between the doctor blade 73 and the developing sleeve 65.

The developing sleeve 65 is rotatable and is made of non-magnetic material installing plural magnets 72. Since the magnet 72 is secured, a magnetic force is applied to developer when the developer passes through a prescribed position. As shown, a diameter of the developing sleeve 65 is about 18 mm. The developing sleeve is produced by applying sand-blast to form plural grooves having a depth of from 1 to few mm, so that a surface roughness (Rz) ranges within 10 to 30 micrometer.

The magnet 72 includes five magnets N1, S1, N2, S2, and S3 in a rotational direction of the developing sleeve 65 from the position of the doc blade 73, for example. The developer forms a magnetic blush under the influence of the magnet 72 and is carried on the developing sleeve 65. On the S1 side of the magnet 72 forming the magnetic brush of the developer, the developing sleeve 65 is arranged opposing the photoconductive member drum (40Bk to 40C).

With the above-mentioned configuration, the two-component developer is conveyed and supplied to the developing sleeve 65 while being circulated and stirred by the pair of screws 68. The developer supplied onto the developing sleeve 65 is drawn up by the magnet 72 and sustained, so that the magnetic brush is formed thereon. As the developing sleeve 65 rotates, an ear of the magnetic brush is cut by the doctor blade 73 to be an appropriate amount. The developer cut off is returned to the stirring section 66. The toner included in the developer carried on the developing sleeve 65 is transferred by a developing bias applied to the developing sleeve 65 to the photoconductive member drum (40Bk to 40C), so that latent image thereof can be visualized. After visualization of the image, the developer remaining on the developing sleeve 65 separates from the developing sleeve 65 where the magnetic force does not exist and returns to the stirring section 66. By repeating this, and when a toner density of toner in the stirring section 66 decreases, the toner sensor 71 detects a prescribed level and toner is replenished to the stirring section 66.

In this embodiment, a developing process is executed on condition where a line speed of each of the photoconductive member drums 40Bk to 40C is about 200 mm/s, that of the developing sleeve 65 is about 240 mm/s, a diameter of each on the photoconductive member drums 40Bk to 40C is about 50 mm, and that of the developing sleeve 65 is about 18 mm. An amount of charge of toner on the developing sleeve 65 is preferably from −10 to −30 micro C/g. The developing gap GP between the photoconductive member drum (40Bk to 40C) and the developing sleeve 65 can range within about 0.8 to 0.4 mm, and developing efficiency can be improved by decreasing the gap. Further, a thickness of the photoconductive member 40 is about 30 micrometer. A beam spot diameter of an optical system is about 50×60 micrometer. A light intensity is about 0.47 mW. Further, a developing process is executed on condition that a charge voltage VO on the photoconductive member drum 40 (before an exposure process) is about −700V, a post exposure voltage VL is about −120V, and a developing bias voltage is about −470V, accordingly, a developing potential is about 350V.

The primary transfer device 62 includes a roller state primary transfer roller 62, and pressure contacts the photoconductive member drum 40 via the intermediate transfer belt 10. Plural conductive rollers 74 are arranged between the primary transfer rollers 62, contacting the side of the substrate layer 11 of the intermediate transfer belt 10. These conductive rollers 74 prevent a bias to be applied by the primary transfer rollers 62 during a transfer process from flowing into the image formation units 18 via the substrate layer 11 having a medium resistance.

The photoconductive member-cleaning device 63 employs a cleaning blade 75 made of polyurethane rubber, and the tip thereof pressure contacts the photoconductive member drum 40. To improve a cleaning performance, a contact type conductive fur brush 76 is rotatably arranged in a direction as shown by an arrow contacting the photoconductive member drum 40 at its outer circumference. A metal electric roller 77 rotatable in a direction as shown by an arrow is provided to apply a bias to the fur brush 76. A tip of a scraper 78 pressure contacts the electric field roller 77. Further, a collection screw 79 is provided to collect toner removed. By cooperation of the photoconductive member cleaning device 63 having the above-mentioned configuration with the fur brush 76 rotating in a counter direction against the photoconductive member drum 40, the toner remaining on the photoconductive member drum 40 is removed. The toner attracting to the fur brush 76 is removed by the electric field roller 77 rotationally contacting the fur brush 76 in the counter direction while receiving bias. The scraper 78 clears the toner attracting to the electric field roller 77. The toner collected by the photoconductive member cleaning device 63 is shifted to one side of the photoconductive member cleaning device 63 by the collection screw 79, and is returned to the developing device 61 by a toner recycle system 80 to be reused there. A charge-removing device 64 includes a charge-removing lamp that initializes a surface voltage of the photoconductive member drum 40 by emitting a light thereto.

The above-mentioned image formation process is executed in the above-mentioned tandem image forming apparatus 20 as mentioned blow. As the photoconductive member drum 40 rotates, the charge device 60 uniformly charges the surface of the photoconductive member drum 40. A writing light L is then emitted onto the photoconductive member drum 40 to form a latent image thereon. Then, the developing device 61 attracts toner and visualizes the latent image to be a toner image. The toner image is then transferred by the primary transfer roller 62 onto the intermediate transfer belt 10 as a primary transfer. The photoconductive member-cleaning device 63 removes toner remaining on the surface of the photoconductive member drum 40 after the image transfer process. The charge-removing device 64 removes charge so that image formation for the next is prepared. The toner removed from the photoconductive member drum is reused by the toner recycle system as mentioned later in detail. An order of color image formation is not limited to the above, and can be changed in accordance with a specification or a performance of the image forming apparatus.

Now, various types of information to be acquired to predict an occurrence of abnormality in a color copier having the above mentioned configuration and methods thereof are specifically described. Various condition information obtained by an information-acquiring device of the copier is roughly categorized into four of sensing information, control parameter information, input information, and image reading information.

Initially, exemplary manners of obtaining various sensing information are described as follows. The sensing information to be acquired includes drive related information, various performances of a rerecording medium, a developer performance, a photoconductive member performance, various process conditions of an electro photograph, an environmental condition, various performances of printings as described below.

First, the drive related information is obtained by the following manners. A rotational speed of a photoconductive member drum is detected by an encoder or by reading a current value or temperature of a driving motor. Similarly, a driving condition of cylindrical or belt like rotation parts, such as a fixing roller, a sheet conveyance roller, a driving roller, etc., is detected. A microphone arranged either inside or outside of an apparatus detects sound generated by driving.

Sheet conveyance condition information is obtained by the following manners. A position of either a leading or a trailing end of a sheet conveyed is read by a transmission or reflection type optical sensor or a contact type sensor to detect sheet jam. In addition, slippage of a leading or trailing end of the sheet at a lap time and deviation of the sheet in a direction perpendicular to the sheet conveyance are read. Similarly, a moving speed of the sheet is calculated in accordance with times detected by plural sensors. Further, slippage between a sheet and a sheet feed roller is detected by comparing a number of rotations of the sheet feed roller and a moving amount of the sheet when the sheet is fed.

Information of various performances of a recording medium, such as a sheet, etc., is obtained by the following manners. Such information largely affects stability of image quality and sheet conveyance. Thus, the below mentioned manner may be employed to acquire this type of information. A thickness of a sheet is detected by sandwiching the sheet with a pair of rollers and detecting a relative positional displacement between the pair of rollers, or detecting a changing amount corresponding to a moving amount of a member lifted by the sheet entering into the rollers. A surface roughness of a sheet is known by causing a guide or the like to contact the surface of the sheet before transfer and detecting vibration or scraping sound caused by the contact. Brilliance of a sheet is known by ejecting an incident light flux thereto at a prescribed aperture angle and measuring a light flux reflecting in a mirror surface reflection direction at a prescribed aperture angle. Rigidity of a sheet is known by detecting a deformation amount (a curvature amount) of the sheet depressed. Recognition of a reproduction sheet is executed by emitting an ultraviolet light to a sheet and detecting permeability thereof. Recognition of one side used sheet is executed by emitting a light from a line state light source, such as an LED, etc., to the sheet, while detecting a reflection light from a transfer surface thereof using a solid state imaging element, such as a CCD, etc. Recognition of an OHP use sheet is executed by emitting a light to a sheet and detecting a regular reflection light therefrom having a different angle from that of a permission light. A water content of a sheet is calculated by detecting absorption of an ultra violet light or a light having a microwave thereinto. Either an optical sensor or a contact sensor detects an amount of curl of a sheet. An electric resistance of a sheet is measured by either causing a pair of electrodes (e.g. sheet feeding rollers) to contact the sheet and directly detecting thereof, or measuring a surface potential of an intermediate transfer belt or a photoconductive member after a transfer process and estimating a resistance of the sheet based on the same.

Information of a developer performance is obtained by the following manner. A performance of developer (i.e., toner and carrier) shown in an apparatus affects a fundamental function of an electro photographic process. Thus, it is important factor for an operation and an out put of a system. Specifically, obtaining information of the developer is significantly important. As the developer performance, the following items are exemplified. As toner information, a charge amount, its distribution, fluidity, an aggregation rate, a banking density, an electric resistance, an additives amount, a consumption amount, a remaining amount, and a toner density (i.e., a toner and carrier mixture rate) and the like are exemplified. As carrier information, a magnetic performance, a coat film thickness, and a spent amount or the like are exemplified.

The above-mentioned item of the information is hardly separately detected in the image forming apparatus in general. Then, they are detected as a total performance of the developer as mentioned below. First, a test use latent image is formed on a photoconductive member. The test use latent image is then developed on a prescribed developing condition. Then, a reflection density (a light reflectivity) from a toner image formed is measured. Otherwise, a pair of electrodes is arranged in the developing device, and a relation between an applied voltage and a current is measured (e.g. a resistance, a dielectric constant, or the like). Otherwise, a coil is arranged in the developing device, and a voltage-current performance is measured (e.g. an inductance). Otherwise, a level sensor of either an optical or electrostatic capacity type is arranged in the developing device, and a developer amount is measured.

Information of a photoconductive member performance is obtained by the following manners. A photoconductive member performance is also closely related to a function of an electro photographic process as the developer performance. As the photoconductive member performance information, a film thickness of the photoconductive member, a surface performance (e.g. a friction coefficient, and an unevenness), a surface voltage (both before and after each process), a surface energy, a confused light, temperature, color, a surface vibration, a line speed, a voltage damping speed, a resistance/electrostatic capacity, a surface water content, or the like are exemplified. Among those, the following information can be detected in the image forming apparatus. Information of a film thickness is obtained based on a change of an electrostatic capacity caused corresponding to a change of a thickness of a film by detecting a current flowing from a charge member to a photoconductive member and referring to a voltage-current performance, which is predetermined by a relation between a voltage applied to the charge member and a dielectric thickness of the photoconductive member. A conventional sensor can detect information of the surface voltage and the temperature. An encoder attached to a rotation shaft of the photoconductive member can detect information of the line speed. An optical sensor can detect the confusion light from the surface of the photoconductive member.

Information of a condition of an electro photographic process is obtained by the following manners. As is well known, toner image formation by means of the electro photographic process is executed by uniformly charging a photoconductive member, forming a latent image using a laser light or the like (an image exposure), developing the latent image with toner (colored particle) having electricity, transferring the toner image onto a transfer sheet (superimposing the same on either an intermediate transfer belt or a recording medium of a final transfer member or developing and superimposing the same on a photoconductive member during development in case of color image formation), and fixing the toner image on the recording medium in this order. Various information in each of the steps largely affects an output of the system, such as an image etc. Thus, obtaining the information is important in evaluating stability of the system. The below mentioned specific information is exemplified as the condition of an electrophotographic process, for example. Both of a charge voltage and an exposure section voltage can be detected by a conventional surface potential sensor. A gap between the charge member and the photoconductive member in a non-contact charge process is detected by measuring intensity of a light passing through the gap. An electromagnetic wave caused by charging is be captured by a broadband antenna system. A sound caused by charging, exposure intensity, and an exposure light wavelength are obtained by known devices.

Further, as a method of obtaining various conditions of a toner image, the followings are exemplified. A pile height (i.e., a height of a toner image) is obtained by measuring a depth thereof in a longitudinal direction using a displacement sensor while measuring a light shielding length thereof in a lateral direction using a linear sensor with a parallel light. A toner charge amount is obtained based on a ratio between a voltage of a latent image in a solid section and a toner image using a potential sensor and a toner attraction amount converted from an output of a reflection density sensor detecting the same section. Information of dot fluctuation or dust information can be obtained by detecting a dot pattern image formed on a photoconductive member using an area sensor of infrared light or that on the intermediate transfer belt using an area sensor having a wavelength corresponding to a color, and applying appropriate processing thereto. An offset amount existing after a fixing process is obtained by reading corresponding positions of a recording sheet and a fixing roller using an optical sensor and comparing those with each other. A non-transfer toner amount is determined based on an intensity of a light reflected from a non-transfer pattern remaining after a transfer process by using an optical sensor arranged on either a photoconductive drum or a belt downstream of a transfer section. Color unevenness possibly caused when color superimposition is executed is detected by a full color sensor that detects a condition of the surf of a recording sheet having been subjected to the fixing process.

Information of a performance of a toner image formed is obtained by the following manner. Image density and color are optically detected based on either a reflection or permission light while selecting a floodlight wavelength in accordance with color. Information of density and mono color are preferably obtained from the surf of a photoconductive member or an intermediate transfer belt. However, color combination such as color unevenness is necessarily measured on a sheet. A gradation performance is detected using an optical sensor by obtaining a reflection density of a toner image transferred onto a transfer member or that formed on a photoconductive member per gradation level. A sharpness can be obtained by reading images formed by developing or transferring a line repeating pattern using either a single eye sensor having a small spot diameter or a high resolution line sensor. A granularity performance (texture touch) is obtained by reading a halftone image and calculating a noise component using a method as used for detecting the sharpness. Registration skew is obtained based on a difference between a registration roller ON time and detection times of optical sensors arranged at both side ends in the main scanning direction downstream of the registration. Color deviation is obtained by detecting an edge portion of a superimposed image on either an intermediate transfer belt or a recording sheet by either a single eye small diameter spot sensor or a high resolution line sensor. Banding (i.e., unevenness of density in a feeding direction) is obtained by measuring density unevenness in the sub scanning direction on the recording sheet using either a single eye small diameter spot sensor or a high resolution line sensor. A brilliance level (unevenness) is obtained by detecting a condition on a recording sheet having a uniform image thereon using a fair reflection light optical sensor. Information of photographic fog is obtained by reading an image background on a photoconductive member, an intermediate transfer belt, or a recording sheet using an optical sensor capable of detecting a relatively wide range. Otherwise, the information is obtained by acquiring image information per area of the background using a high-resolution area sensor and counting a number of toner particles included in the image information.

A physical performance of a print made by an image forming apparatus is obtained by the following manner. Image blur or the like is recognized by detecting a toner image on one of a photoconductive member, an intermediate transfer belt and a recording sheet using an area sensor, and applying image processing to image information thus obtained. Information of dust is obtained by taking in an image on a recording sheet using an area sensor or a high-resolution line sensor and calculating a toner amount scattering around a pattern section. Trailing end error printing or white solid spots information is obtained by detecting a condition of one of a photoconductive member, an intermediate transfer medium, and a recording sheet using a high-resolution line sensor. A displacement sensor detects curl, wave, and folding of a sheet. Such a sensor is effectively positioned in the vicinity of both side ends of the recording sheet for detecting the fold. Stein and cut on across cut surface are photographed and then analyzed by an area sensor vertically arranged on a sheet ejection tray when a prescribed amount of ejection sheets are stacked.

Information of an environment condition is obtained by the following manners. To detect temperature, a thermo couple system capable of extracting a thermal electromotive force as a signal which is caused at a connection point where different metals or metal and semiconductor contact each other, a resistivity change element detecting a change of a resistivity of metal or semiconductor in accordance with temperature, and a pyroelectric element capable of creating a voltage on a surface of a prescribed crystal when temperature increases and arrangement of electric charges within the crystal deviates, can be employed. Otherwise, a thermo magnetic effect element capable of detecting a change of a magnetic performance in accordance with temperature can be employed. To detect humidity, an optical measuring method of measuring light absorption of $H_2O$ or OH group, or a humidity sensor capable of measuring a change of an electric resistance of material due to absorption of vapor can be used. Various gasses are detected by measuring a change of electric resistively of an oxide semiconductor in accordance with absorption of the gas. To detect airflow of a direction, a flowing speed, and a type of gas, an optical measurement method is generally employed. However, considering compact installation to a system, an air bridge type flow sensor is especially advantageous. To detect normal atmosphere and pressure, a pressure sensitive material is used and a mechanical displacement of a membrane is detected. To detect vibration, the same manner is used.

Now, exemplary manners of obtaining various control parameter information are described as follows: Since an operation of an image forming apparatus is determined by a control section, input and output parameter and from the control section are directly effectively used.

As Image formation parameter is as follows. As a direct parameter outputted for image formation by the control section while applying calculation processing, various process condition set by the control section, such as a charge voltage, a developing bias, a fixing temperature, various image processing parameter, such as halftone processing, color correction, and various parameters set by the control section for an operation of an apparatus, such as a time of sheet conveyance, an execution time period of a preparation mode before image formation, etc., are obtained.

As a user operation history of a frequency of various operations selected by a user, a number of colors, a number of sheets, image quality designation, and that of a frequency of sheet size selected by a user are obtained.

As consumption power information, the total power consumed over the total term or a specified term unit (e.g. a day, one week, one month, or the like), distribution thereof, a change amount thereof (differentiation), and an accumulated amount thereof (integration) are obtained.

As an article of consumption information, a usage amount of all of toner, photoconductive members, and sheets used over the total term or a specified term unit (e.g. a day, one week, one month, or the like), distribution thereof, a change amount thereof (differentiation), and an accumulated amount thereof (integration) are obtained.

As malfunction occurrence information, malfunction occurrence frequency (per a type) over the total term or a specified term unit (e.g. a day, one week, one month, or the like), distribution thereof, a change amount thereof (differentiation), and an accumulated amount thereof (integration) are obtained.

Input image information is obtained by the following manner. The blow described information can be obtained from either image information transmitted from a host computer as direct data or image information obtained by reading an original document image using a scanner and applying image processing thereto. Specifically, an accumulation number of coloring pixels can be obtained by counting image data per pixel for each of RGB. For example, a ratio of a character section and a half tone section or the like can be obtained by separating an original image into character, grid, photograph, and a background using a method as described in the Japanese Patent Registration No. No. 2621879. Similarly, a ratio of the color character can be obtained. A toner consumption distribution in the main scanning direction can be obtained by counting an accumulated amount of the coloring pixels per region divided them in the main scanning direction. A size of image can be obtained based on either an image size signal generated by the control section or the distribution of the coloring pixels in the image data. A type of character (a size, a font) is obtained based on attribution data of the character.

Now, an exemplary method of obtaining various data in an image forming apparatus is specifically described. To obtain temperature data, this copier includes a temperature sensor having a significantly compact and simple resistively change element capable of obtaining temperature in a simple principle. To obtain humidity data, a downsized humidity sensor is preferably used. The fundamental principle is that when a humidity sensible ceramics absorbs vapor, ion conduction increases owing to water content and electric resistively of the ceramics decreases. The humidity sensible ceramics is made of multi porous material, such as alumina, apatite, $ZrO_2$—MgO, etc. To obtain vibration data, a sensor that measures normal atmosphere and pressure is used. More preferably, a sensor employing silicone capable of being significantly downsized in view of installation thereof into a system is used. Specifically, a change of capacity between an electrode and a transducer opposing the electrode is measured in accordance with movement of the transducer. The transducer is produced on a thin silicon diaphragm. Otherwise, it can be measured based on a piezo resistively effect of the Si diaphragm itself. To obtain toner density data (for four component colors), toner density is obtained and is digitized as data per color. As a toner density sensor, a known system can be used. For example, a sensing system measures a change of permeability of developer in a developing device and detects a toner density as described in the Japanese Patent Application Laid Open No. Hei 06-289717. To obtain data of a photoconductive member uniform charging voltage (for four component colors), a uniform charge voltage is detected per each of photoconductive members 40K to 40C. A known surface potential sensor can be used for detecting the surface potential of a material body. To obtain photoconductive member post exposure data (for four component colors), a surface voltage is detected per each of photoconductive members 40*k* to 40C after optical writing. To obtain and use coloring area rate date (for four component colors), a coloring area rate is obtained from inputted image data by calculating a rate between an accumulation value of a pixel to be colored and that of the total pixels. To obtain developing toner amount data (for four component colors), a toner attraction amount per unit area in each of respective color toner images developed on the photoconductive members 40K to 40C is calculated based on a light reflection rate obtained by a reflection type photo sensor. The reflection type photo sensor emits an LED light to an object and detects a reflection light therefore with a light reception element. Since a correlation is established between the toner attraction amount and the light reflection rate, the toner attraction amount can be obtained based on the light reflection rate. To obtain inclination at a sheet leading end position, a pair of optical sensors is arranged at both side ends perpendicular to the sheet conveyance direction on a sheet feeding path starting from a sheet feeding roller of the sheet feeding section 200 to a secondary transfer nip and detects the leading end thereof. Specifically, a time period is counted from when a driving signal for driving the sheet-feeding roller is generated to when the transfer sheet passes through both of the optical sensors, and inclination of the transfer sheet in the conveyance direction is obtained based on the time deviation therebetween. To obtain sheet ejection time data, a transfer sheet having passed through a pair of sheet ejection rollers is detected. A time is counted from a transmission time when a driving signal for driving the sheet-feeding roller is generally transmitted to when the transfer sheet passes through both of the optical sensors. To obtain data of a photoconductive member total current (for four component colors), current flowing from the respective photoconductive members 40K to 40C to ground are detected. By arranging a current measuring device between the substrate of a photoconductive member and the ground terminal, the current can be detected. To obtain photoconductive member driving power (for four component colors), a current or voltage scale detects a driving power (current multiplies voltage) spent by a power source that drives the photoconductive member.

Now, a condition information analyzing section included in the control device 104 is described. An operation of the condition information analyzing section is divided into two processes. One of them is a featuring amount extraction process, and the other is a determination process. The purpose of the featuring amount extraction process is to extract a featuring amount related to a time from condition information to utilize the information obtained from the condition information to the maximum. Right before occurrence of a malfunction, the condition information sharply increases or decreases, thereby changing intermittently, frequently. In order to obtain such information, not only from the condition information at a prescribed time point, but also from past few condition information, a time wise change needs to be extracted. For example, as the time wise featuring information, an amount of an outline differential value or an amount of disjunction from a regression curve are exemplified. The outline differential value is obtained by dividing a difference between the newest value and the previous value precedent by one with a print operation time period or a number of print operation times. As the amount of disjunction from the regression curve, a difference between a value predicted from the regression curve and a practical value or twice square root thereof can be used. In this way, by adding the time wise featuring amount to the condition information and inputting those into the next determination process, accuracy of the determination can be improved.

The determination process determines if the featuring amount obtained in the featuring extraction process is in either a normal condition or an abnormal condition. A determination device generated through a mechanical learning can be used in the determination process. The mechanical learning represents algorithm for mechanically ruling a difference between normality and abnormality based on condition information previously separated into normality and abnormality and a featuring amount (called learning data). Specifically, Boosting, Neural network, Support vector machine, or the like are used. A rule generated by the algorithm is called a determination device. When optional condition information is inputted to the determination device, a determination result if the condition information is in either an abnormal state or a normal state is outputted in accordance with the rule. Since most of the machines learning generates a binary determination device, a determination device capable of determining condition information as being normal and abnormal conditions is preferably produced when such a determination device is used to predict a malfunction. For this purpose, learning data is prepared to regard condition information as an abnormal condition when an abnormal signal is outputted during a malfunction condition or right before the malfunction state, and regards that as a normal condition when an apparatus normally operates.

Further, the determination device generated in this way is possibly excessively optimized into the learning data. Specifically, as a result that the determination rule is excessively optimized into condition information unique to inputted learning data, versatility disappears, and the determination device possibly cannot correctly determine condition information other than the learning data. Because, parameter provided when the machine learning is executed is not appropriate, such learning is called excessive one (learning). When the determination device is generated, a test is generally executed to check if a problem occurs owing to the excessive leaning. Thus, previously known abnormal and normal condition information other than learning data are prepared as test data. The test data is inputted to the determination device, and an answer from the determination device is checked if it is correct or not so as to determine if the excessive leaning exists. As a result of the test, when a rate of the correct answers is low and there is possibility of the excessive learning, different learning parameter is designated and the test is executed again based on the same. Whereas when a sufficient correct answer rate is obtained, the determination device thereof is used.

In a conventional malfunction predication system, abnormal condition information is never transmitted from a copier 101 to a control device 104 when the system normally operates. Thus, in the conventional malfunction predication system, it is unknown if a processing operation for abnormal condition information generated in a copier 101 is correctly executed by the malfunction prediction system from when the copier 101 is installed and is an initially set up to be used by a user to when the abnormal information is transmitted from the copier 101. Then, according to this embodiment, a fake abnormal information determined as abnormal by the condition information analysis section in the control device 104 is previously stored in the copier 101. Then, by operating a malfunction prediction system of this embodiment while using the fake abnormal information, it is confirmed if a series of abnormal determination process of this malfunction prediction system appropriately operates for the copier 101.

Figure 6:
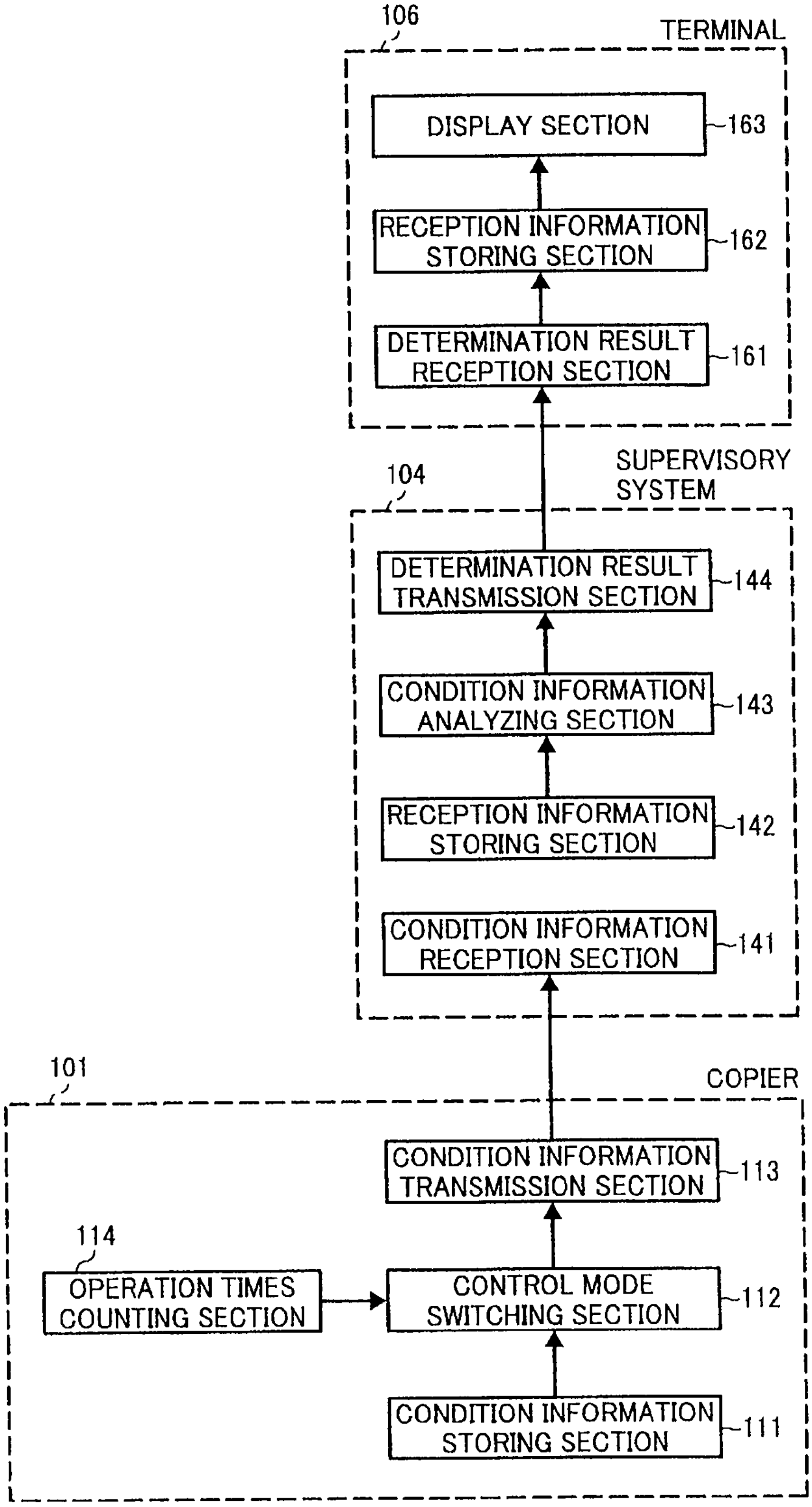
FIG. 6 illustrates an exemplary function of the malfunction prediction system of FIG. 1.

Now, configurations of the copiers 101, the control device 104, and the terminal device 106 are described more in detail with reference to FIG. 6. Each of the copiers 101 includes condition information storage 111 for storing various condition information, a control mode switch device 112 for switching a control mode to one of a test operation mode and a normal operation mode, a condition information transmission section 113 for transmitting condition information and communication information (copier own ID, transmission destination IP address for maintenance information or the like) stored in the condition information storage 111 to the control device 104 via a data communication device 102 and a communication line 103, and an operation times counting section 114.

The control device 104 includes a condition information reception section 141 for receiving the condition information and the communication information transmitted from each of the copiers 101, reception information storage 142 for storing the condition information received one by one per corresponding copier ID, a condition information analysis section 143, and a determination result transmitting section 144. The condition information analysis section 143 analyzes every condition information as mentioned above upon receiving thereof at the condition information reception section 141 including storage information stored in the reception information storage 142. When it is determined that malfunction occurs shortly as a result of the analysis, maintenance information such as the copier ID, predicted malfunction contents (including determination result information) are transmitted from the determination result transmitting section 144. At this moment, the determination result transmitting section 144 transmits the maintenance information to the IP address included ID in the communication information together with the copier. In general, the transmission destination is a terminal device 106 installed in a service station that controls the copier.

The terminal device 106 includes a mini computer or a personal computer. The terminal device 106 includes a determination result reception section 161 for receiving maintenance information including determination result information transmitted from the control section 104, a reception information storage 162 for storing the maintenance information, and a display section 163 for informing a visiting destination to a service person and a condition of a target copier 101 and the like.

Although this embodiment describes an example when the terminal device 106 of the service center reports the determination result, the other device, such as a target copier 101 etc., can have such a function. In such a situation, an IP address of the target copier is simply previously included in communication information. Further, a display device of the control device 104 can inform the determination result and an operator can contact the service person by telephone or similar devices.

Now, an exemplary operation of a series of an abnormality determination process using fake abnormal information and driving the copier 101 as a test is described more in detail. The fake abnormal information stored in each of the copiers 101 is not practical condition information of the copier 101 and is that previously stored before installation thereof. That is, the fake abnormal information is dummy condition information that is always determined as abnormal by the condition information analysis section 143 of the control device 104. As the fake abnormal information stored in the copier 101, the learning data can be used as used at the time of generating the above-mentioned determination device. Among the test data of the determination device, condition information determined as the abnormal condition can be used as the fake abnormal information.

Now, a sequence of confirming an operation of the malfunction predication system using the fake abnormal information is described with reference to FIG. 7. Although an operation of the malfunction prediction system is checked when a new copier is installed and set up at a user site using the fake abnormal information, it can be executed at the other instances, such as a time of executing a maintenance, etc.

Figure 7:
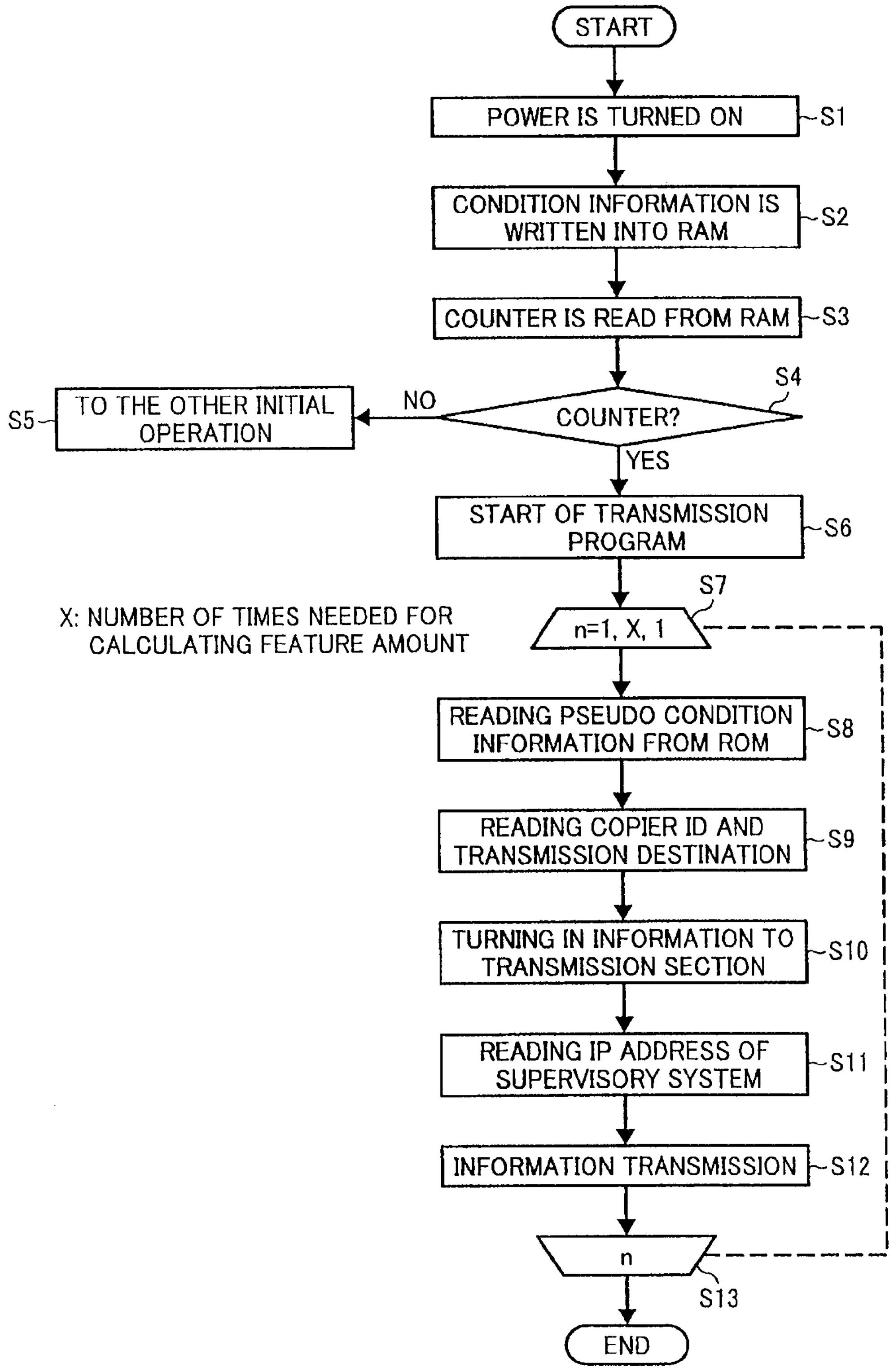
FIG. 7 illustrates an exemplary sequence of examining an operation of the malfunction prediction system using artificial (i.e. fake) abnormal information.

As shown FIG. 7, when a copier arrives and various checking operations have been done by a person of a manufacturer in charge of setting up, fake abnormal information is transmitted to check a condition of an operation of a malfunction prediction system. Such transmission of the fake abnormal information can manually be instructed by the person in charge of setting up, or automatically instructed when a prescribed set up condition is met. When manually instructed, a command for starting transmission of the fake abnormal information is previously included in one of functions of an operation panel of an operation reception device equipped with the copier. A user is preferably ordinarily prohibited from using the command. Since the person in charge of set up possibly forgets such transmission, this embodiment is enabled to automatically transmit the fake abnormal information. For example, when a condition that a power is supplied and a number of times of image formation operations is zero is met, the fake abnormal information is automatically transmitted. As a unique condition employed during a setting up operation other than the above, the fake abnormal information is automatically transmitted when a communication with a control device 104 is firstly established.

As shown in FIG. 7, fake abnormal information transmission program and fake abnormal information are written in a ROM 1*c* and a number of print operation times is set to be a prescribed level (e.g. Zero) when a copier is manufactured. All of ID and an IP address of the copier, an IP address of the control device 104, and an IP address representing a transmission destination of maintenance information are written in a memory, not shown, of the copier before the copier is shipped.

When a copier is set up and a power is turned on in step S1, initializing program is started, and condition information at the time is written in a ROM 1*b* in step S2. Then, the initializing program reads a number of printing times from the RAM 1*b* in step S3. When the number of printing times is zero (Yes, in step S4), the fake abnormal information transmission program is started in step S6. Then, the fake abnormal information is read from the ROM 1*c* in step S8, and copier ID and a transmission destination IP address of the maintenance information is read from a memory at same time in step S9. These are then transferred to the condition information transmission section 113 in step S10. An IP address of the copier 101 is used in this embodiment as the transmission destination IP address of the maintenance information for the fake abnormal information. However, similar to an ordinary operation, an IP address of a terminal device 106 can be used.

Upon receiving the above-mentioned information, the condition information transmission section 113 reads an IP address of the control section 104 from the memory, not shown, in step S11, and transmits the fake abnormal information and the maintenance information transmission destination IP address to the control device 104 in a unit in step S12. When completing transmission, the condition information transmission section 113 transmits information representing such an effect to transmission program. When confirming the transmission completion, the transmission program reads the next fake abnormal information stored in the ROM 1*c* and executes the same operation as above. When completing such operations a prescribed number of times X (in steps S7 and S13), the transmission program terminates its operation. The prescribed number of times X may correspond to a number of times needed for calculating a time wise featuring amount in the condition information analysis section 143 of the control section 104. That is, unless there exists the number X in the reception information storage 142 of the control device 104 for such featuring calculation, the condition information analysis section 143 cannot accomplish a determination operation.

Upon receiving the fake abnormal information and the maintenance information transmission destination IP address, the control device 104 registers those in database provided in the reception information storage 142 linking with the copier ID. When more than the prescribed number of times X of information of the copier ID has been stored, the condition information analyzing section 143 starts operating. Thus, the condition information analyzing section 143 determines if a new condition is either abnormal or not. The following operation is the same as an ordinary determination process in that a prescribed number of fake abnormal information needed for calculating a featuring amount is taken out from the database, and featuring amount calculation and determination operation are executed. Since the fake abnormal information to be determined as abnormal is selected beforehand, a determination result here is abnormal. After that, the determination result transmission section 144 reads the transmission IP address of the copier 101 receiving maintenance information and transmits the maintenance information together with the determination result information thereto.

As mentioned above, since the transmission IP address receiving the maintenance information equals the IP address of the copier 101, the maintenance information is transmitted to the copier 101. Upon receiving the maintenance information, the copier 101 displays such an effect on a display panel. A person in charge of the maintenance confirms if the maintenance information displayed thereon corresponds to the malfunction of the fake abnormal information designated. If it can be confirmed, he or she can recognize that the malfunction predication system correctly operates. When he or she considers it insufficient only to confirm one fake abnormal information corresponding to one malfunction, he or she can write plural types of fake abnormal information in the ROM 1*c*, so that he or she can optionally designate a type or a number of malfunctions when starting up the transmission program.

Obviously, numerous additional modifications and variations of the present invention are possible in light of the above teachings. It is therefore to be understood that within the scope of the appended claims, the present invention may be practiced otherwise than as specifically described herein.

What is claimed is:

1. An image forming apparatus for connection, via a communication network, to a condition determination device that determines a condition of the image forming apparatus and reports a result of the determination when the condition of the image forming apparatus is determined as being abnormal, said image forming apparatus comprising:

a control mode switching device configured to switch a control mode to one of a test operation mode for executing a prescribed test and a normal operation mode;

a condition information transmission device configured to transmit condition information to the condition determination device during the normal operation at a prescribe time, said condition information representing a condition of the image forming apparatus, said condition information transmitting device further transmitting fake abnormal information to the condition determination device instead of the condition information in the test operation mode, said fake abnormal information representing an abnormal condition of the image forming apparatus; and an information accumulating device configured to accumulate one of image formation times and image formation periods since a prescribed time point, wherein said mode switching device switches the mode to the test operation mode when a prescribed test operation condition specified by one of prescribed accumulated amounts of image formation times and periods is met.

2. The image forming apparatus as claimed in claim 1, further comprising:

a determination result reception device configured to receive the result of determination made as to the fake abnormal information by the condition determination device from the condition information transmission device; and a determination result-informing device configured to inform the determination result received by the determination result reception device.

3. The image forming apparatus as claimed in claim 1, further comprising:

an operation instruction reception device, wherein said mode switching device switches the operation mode to the test operation mode in accordance with an operation instruction received by the operation instruction reception device.

4. An image forming apparatus for connection, via a communication network, to a condition determination device that determines a condition of the image forming apparatus and reports a result of the determination when the condition of the image forming apparatus is determined as being abnormal, said image forming apparatus comprising:

a control mode switching device configured to switch a control mode to one of a test operation mode for executing a prescribed test and a normal operation mode; and a condition information transmission device configured to transmit condition information to the condition determination device during the normal operation at a prescribe time, said condition information representing a condition of the image forming apparatus, said condition information transmitting device further transmitting fake abnormal information to the condition determination device instead of the condition information in the test operation mode, said fake abnormal information representing an abnormal condition of the image forming apparatus, wherein said control mode switching device switches to the test operation mode when communication with the condition determination device is firstly established via the communication network.

5. An image forming apparatus for connection, via a communication network, to a condition determination device that determines a condition of the image forming apparatus and reports a result of the determination when the condition of the image forming apparatus is determined as being abnormal, said image forming apparatus comprising:

a control mode switching device configured to switch a control mode to one of a test operation mode for executing a prescribed test and a normal operation mode;

a condition information transmission device configured to transmit condition information to the condition determination device during the normal operation at a prescribe time, said condition information representing a condition of the image forming apparatus, said condition information transmitting device further transmitting fake abnormal information to the condition determination device instead of the condition information in the test operation mode, said fake abnormal information representing an abnormal condition of the image forming apparatus;

an information collecting device configured to collect process control use information; and a process control device configured to adjust an image formation condition based on the process control use information at a prescribed time;

wherein said condition information includes the process control use information, and wherein said fake abnormal information including fake process control use information.

6. An image forming apparatus for connection, via a communication network, to a condition determination device that determines a condition of the image forming apparatus and reports a result of the determination when the condition of the image forming apparatus is determined as being abnormal, said image forming apparatus comprising:

a control mode switching device configured to switch a control mode to one of a test operation mode for executing a prescribed test and a normal operation mode;

a condition information transmission device configured to transmit condition information to the condition determination device during the normal operation at a prescribe time, said condition information representing a condition of the image forming apparatus, said condition information transmitting device further transmitting fake abnormal information to the condition determination device instead of the condition information in the test operation mode, said fake abnormal information representing an abnormal condition of the image forming apparatus; and an accumulating device configured to accumulate one of a number of image formation times and periods since a prescribed time point, wherein said condition information includes one of image formation times and periods, and wherein said fake abnormal information includes one of fake image formation times and periods.

7. An image forming apparatus for connection, via a communication network, to a condition determination device that determines a condition of the image forming apparatus and reports a result of the determination when the condition of the image forming apparatus is determined as being abnormal, said image forming apparatus comprising:

a control mode switching device configured to switch a control mode to one of a test operation mode for executing a prescribed test and a normal operation mode; and a condition information transmission device configured to transmit condition information to the condition determination device during the normal operation at a prescribe time, said condition information representing a condition of the image forming apparatus, said condition information transmitting device further transmitting fake abnormal information to the condition determination device instead of the condition information in the test operation mode, said fake abnormal information representing an abnormal condition of the image forming apparatus, wherein said condition information transmitting device transmits at least two pieces of fake abnormal information to the condition determination device one by one in the test operation mode, said at least two pieces of the fake abnormal information being examined separately by the condition determination device.

* * * * *